US 8,261,126 B2

(12) United States Patent
Sosnosky et al.

(10) Patent No.: US 8,261,126 B2
(45) Date of Patent: Sep. 4, 2012

(54) BARE METAL MACHINE RECOVERY FROM THE CLOUD

(75) Inventors: Lara M. Sosnosky, Kirkland, WA (US); Elissa E. Murphy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 364 days.

(21) Appl. No.: 12/417,776

(22) Filed: Apr. 3, 2009

(65) Prior Publication Data

US 2010/0257346 A1  Oct. 7, 2010

(51) Int. Cl.
G06F 11/00  (2006.01)
(52) U.S. Cl. .................. 714/13; 714/10; 714/2; 714/23
(58) Field of Classification Search ............... 714/2, 4.1, 714/4.11, 23, 25, 10, 13, 48
See application file for complete search history.

(56) References Cited

U.S. PATENT DOCUMENTS

| | | | |
|---|---|---|---|
| 6,195,679 B1 | 2/2001 | Bauersfeld et al. | |
| 6,292,827 B1 | 9/2001 | Raz | |
| 6,549,944 B1 | 4/2003 | Weinberg et al. | |
| 6,819,343 B1 | 11/2004 | Sobeski et al. | |
| 7,089,237 B2 | 8/2006 | Turnbull et al. | |
| 7,330,997 B1 * | 2/2008 | Odom ........................... | 714/6.23 |
| 7,475,282 B2 | 1/2009 | Tormasov | |
| 2002/0103789 A1 | 8/2002 | Turnbull et al. | |
| 2002/0147805 A1 | 10/2002 | Leshem et al. | |
| 2004/0083355 A1 | 4/2004 | Smith | |
| 2004/0167928 A1 | 8/2004 | Anderson et al. | |
| 2005/0033803 A1 | 2/2005 | Vleet et al. | |
| 2005/0216911 A1 | 9/2005 | Yen | |
| 2005/0256972 A1 * | 11/2005 | Cochran et al. ............... | 709/245 |
| 2006/0015764 A1 * | 1/2006 | Ocko et al. ........................ | 714/4 |
| 2006/0129910 A1 | 6/2006 | Djabarov | |
| 2006/0173880 A1 | 8/2006 | Alberts et al. | |
| 2006/0212350 A1 | 9/2006 | Ellis et al. | |
| 2006/0230076 A1 * | 10/2006 | Gounares et al. ............. | 707/200 |
| 2006/0282416 A1 | 12/2006 | Gross et al. | |
| 2007/0107054 A1 | 5/2007 | Averbuch et al. | |
| 2007/0143264 A1 | 6/2007 | Szeto | |
| 2007/0162422 A1 | 7/2007 | Djabarov | |
| 2007/0203916 A1 | 8/2007 | Kwak | |

(Continued)

OTHER PUBLICATIONS

Barnett, et al., A Web-based Backup/Restore Method for Intel-based PC's http://www.usenix.org/publications/library/proceedings/lisa97/full_papers/10.barnett/10.pdf. Last accessed Jan. 24, 2009, 9 pages.

(Continued)

*Primary Examiner* — Scott Baderman
*Assistant Examiner* — Sarai Butler

(57) ABSTRACT

Provided herein are systems and methodologies for bare metal machine restoration of a client computing environment over a network-based backup system. System recovery can be performed by performing a network boot from a predetermined server or set of servers on the Internet and/or an associated local network, followed by retrieving information relating to an operating system and/or environment of a system being recovered, such as incremental or full operating system images. Upon retrieval of information, the information can be used to conduct a full restore of the operating environment of the computing device. Additionally, a user can restore personal or other system data following rebuilding of the system operating environment. A cloud-based structure is provided herein as well as a hybrid peer-to-peer/cloud-based structure, wherein information used in a restore can be obtained from a global network location (e.g., cloud server (s)) and/or from one or more local peers.

16 Claims, 11 Drawing Sheets

U.S. PATENT DOCUMENTS

| | | | |
|---|---|---|---|
| 2007/0233692 A1 | 10/2007 | Lisa et al. | |
| 2007/0294566 A1* | 12/2007 | Solyanik | 714/6 |
| 2008/0005611 A1 | 1/2008 | Solyanik | |
| 2008/0091526 A1 | 4/2008 | Shoemaker | |
| 2008/0201607 A1* | 8/2008 | Braeker et al. | 714/15 |
| 2008/0208933 A1* | 8/2008 | Lyon | 707/204 |
| 2008/0306934 A1 | 12/2008 | Craswell et al. | |
| 2009/0164408 A1 | 6/2009 | Grigorik et al. | |
| 2009/0307762 A1 | 12/2009 | Cudd | |
| 2010/0153768 A1* | 6/2010 | Yildiz | 714/2 |

OTHER PUBLICATIONS

Hallback, Distribution of Incremental Disk Images http://epubl.luth.se/1404-5494/2004/052/LTU-HIP-EX-04052-SE.pdf. Last accessed Jan. 24, 2009, 72 pages.

Backup and Restore in Windows Vista and Windows Server Longhorn http://download.microsoft.com/download/5/b/9/5b97017b-e28a-4bae-ba48-174cf47d23cd/BUS107_WH06.ppt#315, 11,CompletePC Image Backup Block-level backup of the entire PC. Last accessed Jan. 24, 2009, 6 pages.

Harless, Bare-Metal Disaster Recovery http://www.dell.com/downloads/global/power/ps1q05-20040309-Yosemite.pdf. Last accessed Jan. 24, 2009, 3 pages.

Forum Pakistan—Pakistani Forums, Shaadi-Direct.com, http://www.forumpakistan.com/toolbarstudio-ide-t18439.html, Mar. 6, 2009, 5 pages.

E. Kirda, et al., Behaviour-based Spyware Detection. In Usenix Security Symposium, 2006. pp. 273-288.

Abu-Nimeh, et al., Bypassing Security Toolbars and Phishing Filters via DNS Poisoning. Global Telecommunications Conference, 2008, IEEE Globecom 2008, IEEE, vol. No. Nov. 30, 2008-Dec. 4, 2008, pp. 1-6.

OA dated Mar. 17, 2011 for U.S. Appl. No. 12/432,846, 19 pages.

* cited by examiner

BARE METAL MACHINE RECOVERY FROM THE CLOUD

BACKGROUND

As computing devices become more prevalent and widely used among the general population, the amount of data generated and utilized by such devices has rapidly increased. For example, recent advancements in computing and data storage technology have enabled even the most limited form-factor devices to store and process large amounts of information for a variety of data-hungry applications such as document editing, media processing, and the like. Further, recent advancements in communication technology can enable computing devices to communicate data at a high rate of speed. These advancements have led to, among other technologies, the implementation of distributed computing services that can, for example, be conducted using computing devices at multiple locations on a network. In addition, such advancements have enabled the implementation of services such as network-based backup, which allow a user of a computing device to maintain one or more backup copies of data associated with the computing device at a remote location on a network.

Backup systems can be utilized to restore a backup client machine to a previous known-good state in the event of data loss, system failure, and/or other similar events. For example, in the event of an operating system (OS) crash at a client machine, a backup system can be utilized to restore the OS of the client machine to an operational state. However, the operational state of a client machine subsequent to an OS crash can potentially lead to significant difficulty in booting the machine to a state in which the OS and/or other information associated with the machine can be recovered. Accordingly, it would be desirable to implement improved techniques for system recovery within a backup environment.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems and methodologies are provided herein that facilitate restoration of a client computing system over a network-based backup system. In one example, upon determining that a system (e.g., OS) failure has occurred, data and/or system information has been lost, and/or a user otherwise desires to recover a previous operating state of an associated computing device, a network boot can be performed for the device from a predetermined server or set of servers (e.g., a "cloud" computing environment) on the Internet and/or a local network associated with the device. Subsequently, information relating to a desired version of the OS and/or operating environment of the computing device (e.g. as provided in a partial or complete system image) can be retrieved from one or more network entities from which the computing device has been booted and/or one or more other network entities. Based on the retrieved information, a full restore of the operating environment of the computing device can be conducted. In one example described herein, following the system restoration, a user can additionally restore one or more data files and/or other information that do not directly relate to the operational environment of the computing device.

In accordance with one aspect, a hybrid architecture can be employed for backup and/or restoration of system information and/or other data, wherein information needed to conduct a restore can be made available to a backup client from a global location within a network or internetwork (e.g., cloud server(s)) as well as from one or more peer machines associated with a machine on which the backup client is located. Accordingly, a backup client can obtain some or all information necessary for carrying out a restore from either the cloud or a nearby peer in order to reduce latency and bandwidth consumption requirements in some cases. In one example, selection of locations to be utilized for storing and/or retrieving backup information can be selected in an intelligent and automated manner based on factors such as availability of network locations, relative loading, network topology, or the like.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
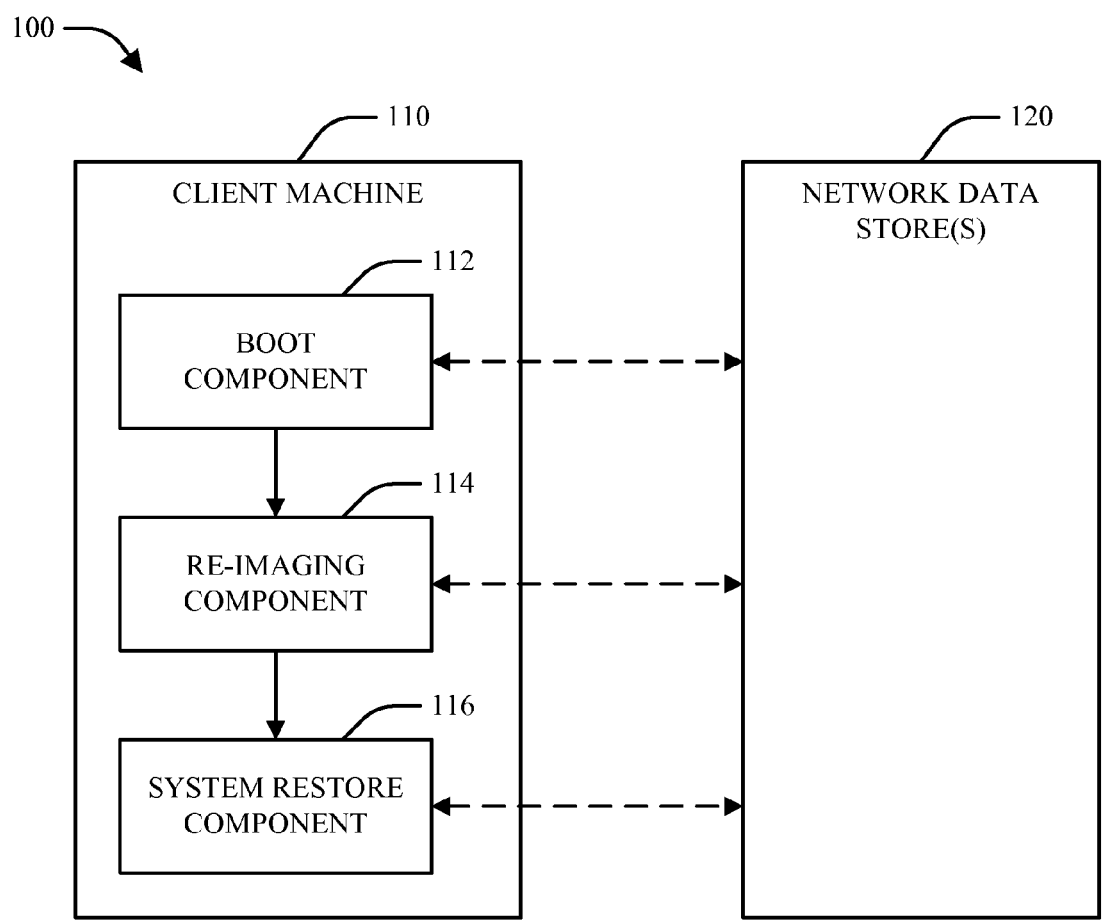
FIG. 1 is a high-level block diagram of a system for restoring a system operating environment from backup information in accordance with various aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," "interface," "schema," "algorithm," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawings, FIG. 1 illustrates a block diagram of a system 100 for restoring a system operating environment from backup information in accordance with various aspects described herein. As system 100 illustrates, restoration can be performed for an operating environment corresponding to a client machine 110 by leveraging one or more network-based backup techniques detailed herein, in which associated system information and/or other data can be located at one or more network data stores 120. As described herein, client machine 110 can be any suitable computing device such as, for example, a personal computer (PC), a notebook or tablet computer, a personal digital assistant (PDA), a smartphone, or the like. Further, network data store(s) 120 can be associated with any suitable number of computing devices located in a network and/or internetwork associated with client machine 110.

In one example, system 100 can be utilized to restore files, system images, and/or other data from a current version residing on a client machine 110 to a desired version residing at network data store(s) 120. Additionally or alternatively, a full restore of information can be conducted at client machine 110 from information stored at network data store(s) 120 in the event of data loss (e.g., due to disk corruption, inadvertent deletion or formatting, etc.) or a similar event. In accordance with one aspect, system 100 can be utilized in connection with a network-based or online backup solution (e.g., a cloud backup system, as described in further detail infra) that stores backup information from client machine 110 via the network data store(s) 120.

In general, backup systems are deployed to enable a client machine to be returned to a previous known-good state in the event of a loss of critical data, system failure, and/or other such events that materially impact the operational ability of the client machine. For example, backup systems can be utilized to restore an OS associated with a client machine in the event of a system crash. However, when a client machine crashes, it can be appreciated that it is often difficult to boot the client machine to a state where the operating system and/or files associated with the client machine can be recovered. Some conventional processes for restoring a system rely on physical media (e.g., a floppy disk, CD-ROM, flash memory device, etc.) to boot a client machine and to provide one or more techniques by which system data can be recovered after booting. However, if required physical media is lost, is located in a disparate location from the client device (e.g., in the case of a portable computing device that fails at a location remote from the necessary physical media), or is otherwise inaccessible to a user of the client machine, such restoration techniques are rendered substantially impracticable.

Accordingly, in an aspect, techniques are provided herein to enable a user of a client machine 110 to perform a network boot across the Internet and/or a local subnet to one or more network data stores 120 in order to obtain an OS image or incremental images needed to rebuild client machine 110. It can therefore be appreciated that system 100 can be utilized to significantly reduce reliance on physical media in connection with the recovery of a client machine 110 and/or to otherwise substantially increase efficiency of restore operations for client machine 110. Further, while conventional computing systems can enable a user to perform a network boot in a managed intranet environment, such systems do not provide the capability to network boot across the Internet to obtain all or part of an OS image and/or to restore a particular version of related data and/or applications. In contrast, it can be appreciated that system 100 provides mechanisms by which a user can perform a network boot to rebuild his or her associated client machine 110 and restore his or her data from one or more network data stores 120, which can correspond to a cloud-based backup provider and/or any other suitable type of service provider residing on the Internet.

In accordance with one aspect, client machine 110 can include a boot component 112, which can facilitate a network boot of client machine 112 from one or more network data stores 120 that reside in a network or internetwork associated with client machine 110. In one example, network data store(s) 120 utilized by boot component 112 can contain information with which client machine 110 can be restored. This information can include, for example, some or all of an OS image associated with client machine 110, a system snapshot or image associated with client machine 110, and/or other suitable information. Information can be obtained as full files or images, or in an alternative example information can be stored as a series of incremental images in order to allow client machine 110 to conduct a partial restore (e.g., to roll back information at client machine 110 from a locally available version to a previous version) and/or to otherwise conduct a system restoration without requiring transfer of entire images. In one example, images and/or other information stored by network data store(s) 120 can be provided in an imaging file format, such as Virtual Hard Disk (VHD) format, Windows® Imaging (WIM) format, or the like.

Boot component 112 can be initiated to boot from an external entity using any suitable techniques. For example, a network boot can be performed as a Preboot Execution Environment (PXE) boot and/or a similar type of network boot to a peer or super-peer machine, initiated using a physical restoration disk (e.g., as a Windows® Preinstallation Environment (WinPE) boot to a designated Internet server), and/or initialized in any other suitable manner. Further, it should be appreciated that boot component 112 can boot directly from a network data store 120 at which system information relating to client machine 110 is stored, or alternatively such a network data store 120 can direct client machine 110 to one or more other appropriate network data stores 120.

Upon establishment of a connection to network data store(s) 120 via boot component 112, a re-imaging component 114 at client machine 110 can obtain some or all of an OS image and/or other operational information pertaining to client machine 110 from network data store(s) 120 and restore client machine 110 to a working state based on the obtained information. In one example, re-imaging component 114 can facilitate deletion of some or all data present at client machine 110 prior to rebuilding the OS associated with client machine, thereby facilitating recovery of client machine from a clean (e.g., "bare metal") state. Such deletion can include, but does not require, reformatting and/or repartitioning of one or more hard disks associated with client machine 110.

In one example, network data store(s) 120 can contain respective images and/or a series of incremental images that correspond to respective states or versions of client machine 110 over time, and re-imaging component 114 can facilitate recovery of client machine 110 to a selected version and/or corresponding point in time by obtaining an image and/or one or more incremental images that correspond to the desired version in time. Additionally or alternatively, re-imaging component 114 can facilitate recovery of client machine 110 to a default state, which can correspond to, for example, the state of client machine 110 at its creation, at the time of installation of a given OS, and/or any other suitable time.

In accordance with one aspect, once re-imaging component 114 has rebuilt the operating environment associated with client machine 110, a system restore component 116 can be utilized to further recover user files, information, system settings, or the like associated with client machine 110 from one or more network data stores 120. Network data stores 120 from which system restore component 116 obtains information can be the same as and/or distinct from network data stores 120 utilized by re-imaging component 114.

In one example, information obtained and/or rebuilt by system restore component 116 can include files, settings, and/or other information residing on client machine 110 at or immediately prior to the time of restoration. Accordingly, re-imaging component 114 and system restore component 116 can act in cooperation to clear associated storage at client machine 110 to an empty or bare metal state, recover an OS and/or operational environment associated with client machine, and subsequently restore the other files, settings, and/or information as captured immediately prior to the restore.

In another example, boot component 112, re-imaging component 114, and/or system restore component 116 can utilize one or more authentication measures to provide a secure connection to network data store(s) for rebuilding client machine 110. As a specific example, upon rebuilding an OS associated with client machine 110, a user can leverage system restore component 116 to authenticate and sign on to one or more network data stores 120 to recover further information.

In accordance with one aspect, network data stores 120 can include one or more peer or super-peer storage locations on a local network associated with client machine as well as one or more cloud storage locations located on the Internet. Accordingly, re-imaging component 114 and/or system restore component 116 can locate information in an intelligent and/or automated manner to discover a path of least resistance for obtaining respective data. For example, factors such as network availability, loading, proximity of respective storage locations, or the like, can be utilized to determine a most efficient manner for obtaining information from network data store(s) 120. By way of specific example, it can be determined that a given file is located both at a cloud storage location on the Internet and at one or more local peer machines. In such an example, retrieval of the file can be conducted from the nearest available peer to facilitate faster retrieval and conserve network bandwidth, falling back to the cloud only if no peers are available. Further examples of implementations that can be utilized for a hybrid peer-to-peer (P2P)/cloud storage architecture are provided infra.

In accordance with another aspect, re-imaging component 114 and/or system restore component 116 can restore one or more files using, for example, a reverse difference algorithm in which changes in a current version over a desired version are rolled back using respective file segments that correspond to differences and/or changes between the current version of the file and the desired version. It should be appreciated, however, that system and/or file restoration can be performed as described herein using any suitable algorithm.

Figure 2:
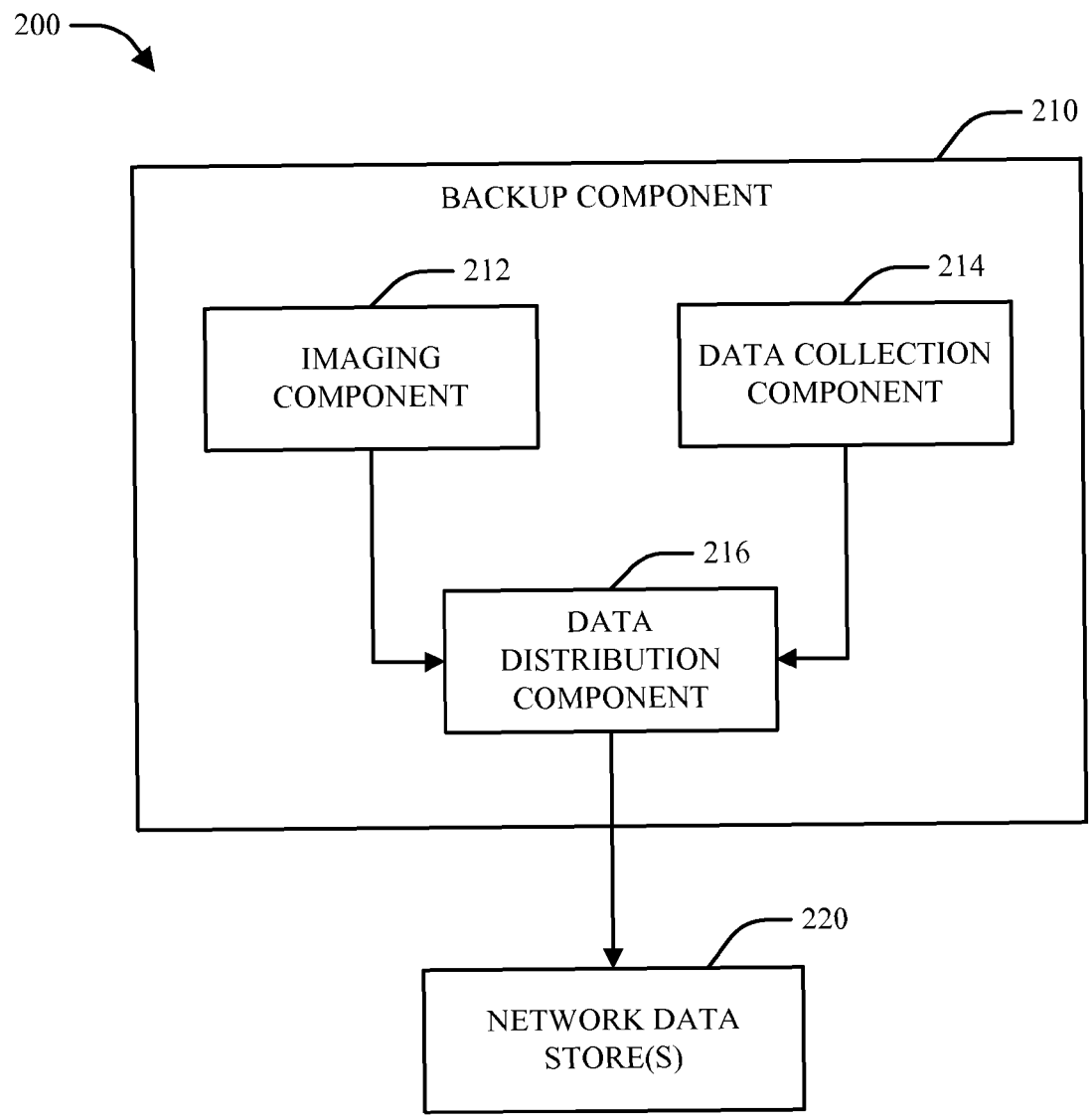
FIG. 2 is a block diagram of a system for generating backup information in accordance with various aspects.

Turning now to FIG. 2, a system 200 for generating backup information in accordance with various aspects is illustrated. As FIG. 2 illustrates, system 200 can include a backup component 210, which can generate and facilitate storage of backup copies of files, system snapshots, and/or other information associated with a backup client machine (e.g., user machine 110). In one example, backup component 210 can reside on and/or operate locally from a backup client machine. Additionally or alternatively, backup component 210 can reside on a disparate computing device (e.g., as a remotely executed component). In one example, backup component 210 can be utilized to back up a set of files and/or other information at a regular interval in time, upon the triggering of one or more events (e.g., modification of a file), and/or based on any other suitable activating criteria.

In one example, backup component 210 can include an imaging component 212, which can create and/or otherwise obtain images or snapshots of an operating environment (e.g., OS) associated with a client machine. Additionally or alternatively, backup component 210 can include a data collection component 214, which can identify system settings, files, and/or other information residing on the associated client machine. It should be appreciated that imaging component 212 and/or data collection component 214 can obtain full files, images, or sets thereof, or respective incremental or delta updates to such files and/or images.

In accordance with one aspect, information obtained via imaging component 212 and/or data collection component 216 can be provided to a data distribution component 220, which in turn can distribute the information among one or more network data stores 220 at one or more network storage locations. Network data stores 220 can be associated with, for example, peer or super-peer machines in a local network, a cloud storage service or another suitable Internet-based storage location, and/or any other storage site.

Figure 3:
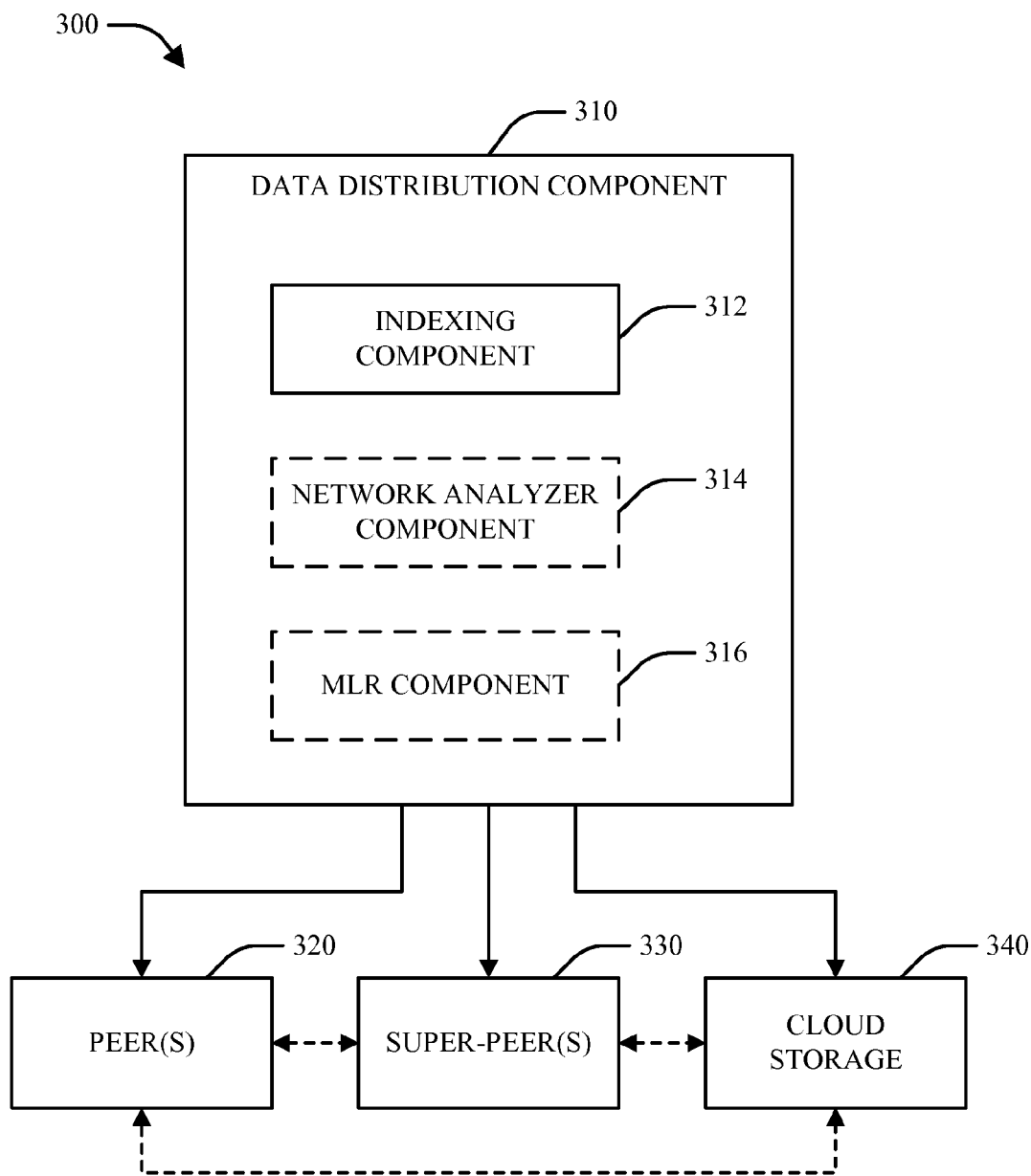
FIG. 3 is a block diagram of a system for distributing backup information throughout a hybrid cloud-based and peer-to-peer backup storage system in accordance with various aspects.

In accordance with another aspect, distribution of data associated with a backup system is illustrated in further detail by system 300 in FIG. 3. As FIG. 3 illustrates, system 300 can include a data distribution component 310, which can distribute data associated with a client machine among one or more storage locations. In an aspect as illustrated by system 300, a hybrid P2P/cloud-based architecture can be utilized by system 300. By using such an architecture, it can be appreciated that data distribution component 310 can distribute information to storage locations such as one or more trusted peers, such as peer(s) 320 and/or super-peer(s) 330, one or more cloud storage locations 340, and/or any other suitable location(s).

As further illustrated in system 300, peer(s) 320, super-peer(s) 330, and/or cloud storage 340 can be further operable to communicate system images, files, and/or other information between each other. In addition, it can be appreciated that data distribution component 310 and/or any other components of system 300 could additionally be associated with one or more peers 320, super-peers 330, or entities associated with cloud storage 340. Further detail regarding techniques by which peer(s) 320, super-peer(s) 330, and cloud storage 340 can be utilized, as well as further detail regarding the function of such entities within a hybrid architecture, is provided infra.

In accordance with another aspect, data distribution component 310 can include and/or otherwise be associated with an indexing component 312, which can maintain an index of respective mapping relationships between information distributed by data distribution component 310 and corresponding locations to which the information has been distributed. In one example, this index can be distributed along with information represented therein to one or more peers 320, super-peers 330, or cloud storage locations 340. It can be appreciated that an entire index can be distributed to one or more locations, or that an index can additionally or alternatively be segmented and distributed among multiple locations.

In accordance with an additional aspect, data distribution component 310 can further optionally include a network analyzer component 314, which can analyze a computing network associated with system 300 to determine one or more locations to distribute respective information. In one example, network analyzer component 314 can select one or more destinations for information to be distributed based on network loading, availability of storage locations (e.g., based on device activity levels, powered-on or powered-off status, available storage space at respective locations, etc.), or the like. This can be done, for example, to balance availability of various data with optimal locality.

As system 300 further illustrates, a machine learning and reasoning (MLR) component 316 can additionally be employed by data distribution component 310 and/or network analyzer component 314 to facilitate intelligent, automated selection of storage locations for respective information. In one example, MLR component 316 can utilize any suitable artificial intelligence (AI), machine learning, and/or other algorithm(s) generally known in the art. As used in this description, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms (e.g., decision trees, neural networks, regression analysis, cluster analysis, genetic algorithm, and reinforced learning) to a set of available data (information) on the system. For example, one or more of numerous methodologies can be employed for learning from data and then drawing inferences from the models so constructed, e.g. hidden Markov models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches (that perform data fusion, etc.) in accordance with implementing various automated aspects described herein.

Figure 4:
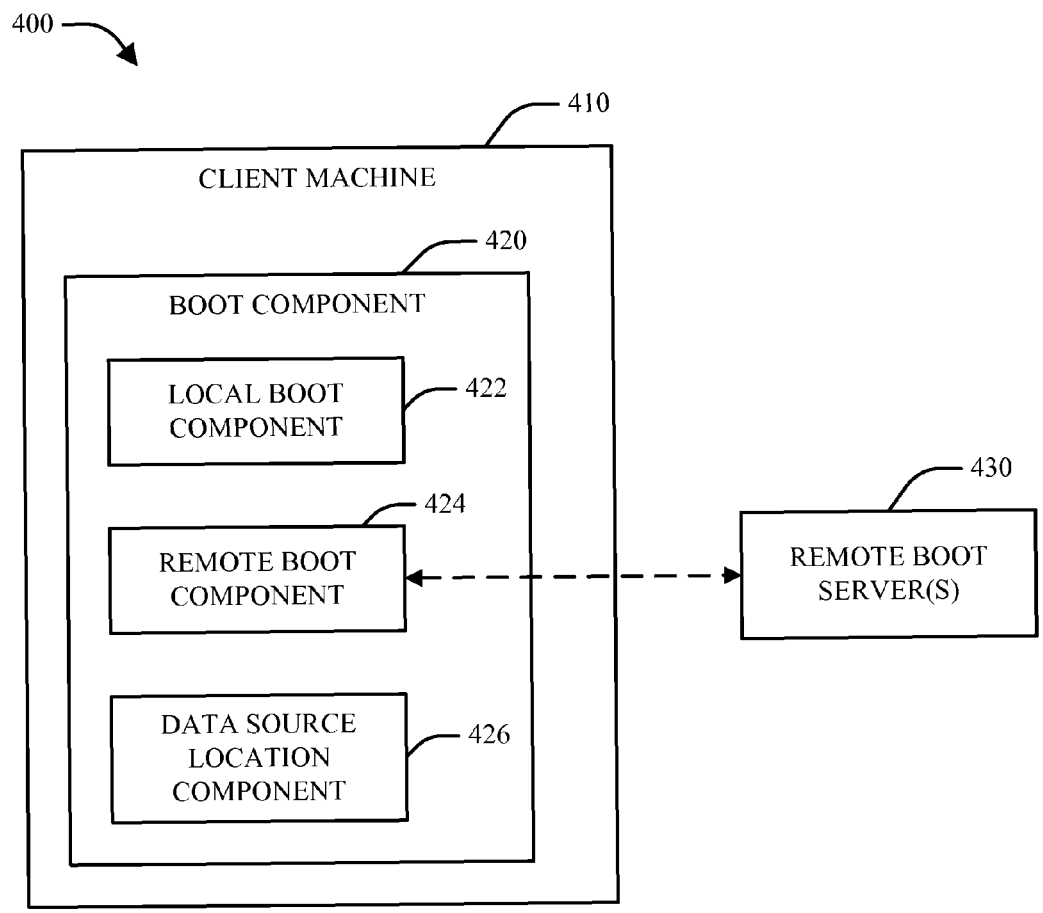
FIG. 4 is a block diagram of a system for initializing system restoration from a backup system in accordance with various aspects.

Turning now to FIG. 4, a system 400 for initializing system restoration from a backup system in accordance with various aspects is illustrated. As FIG. 4 illustrates, system 400 can include a client machine 410, which in turn can include a boot component 420. In one example, in the event that it is desired to rebuild the operating system of client machine 410, boot component 420 can initialize a process by which a full or partial image of the operating system is recovered over a network as generally described above. To these ends, boot component 420 can include a local boot component 422 that can boot client machine 410 based on locally available information (e.g., a physical computer-readable medium provided to client machine 410) and/or a remote boot component 424 that can facilitate booting of client machine 410 based on information obtained from one or more remote boot servers 430 via an associated network or internetwork.

In accordance with one aspect, once client machine 410 has been successfully initialized by local boot component 422 and/or remote boot component 424, a data source location component 426 can be utilized to determine a location at which an operating system image (or portions thereof) for restoring client machine 410 can be found. In one example, a location identified by data source location component 426 for obtaining operating system data can be the same as a remote boot server 430 used to boot client machine 410 or a different location. For example, upon successful network booting, a remote boot server 430 can direct client machine 410 to a disparate location at which restoration information can be obtained.

Figure 5:
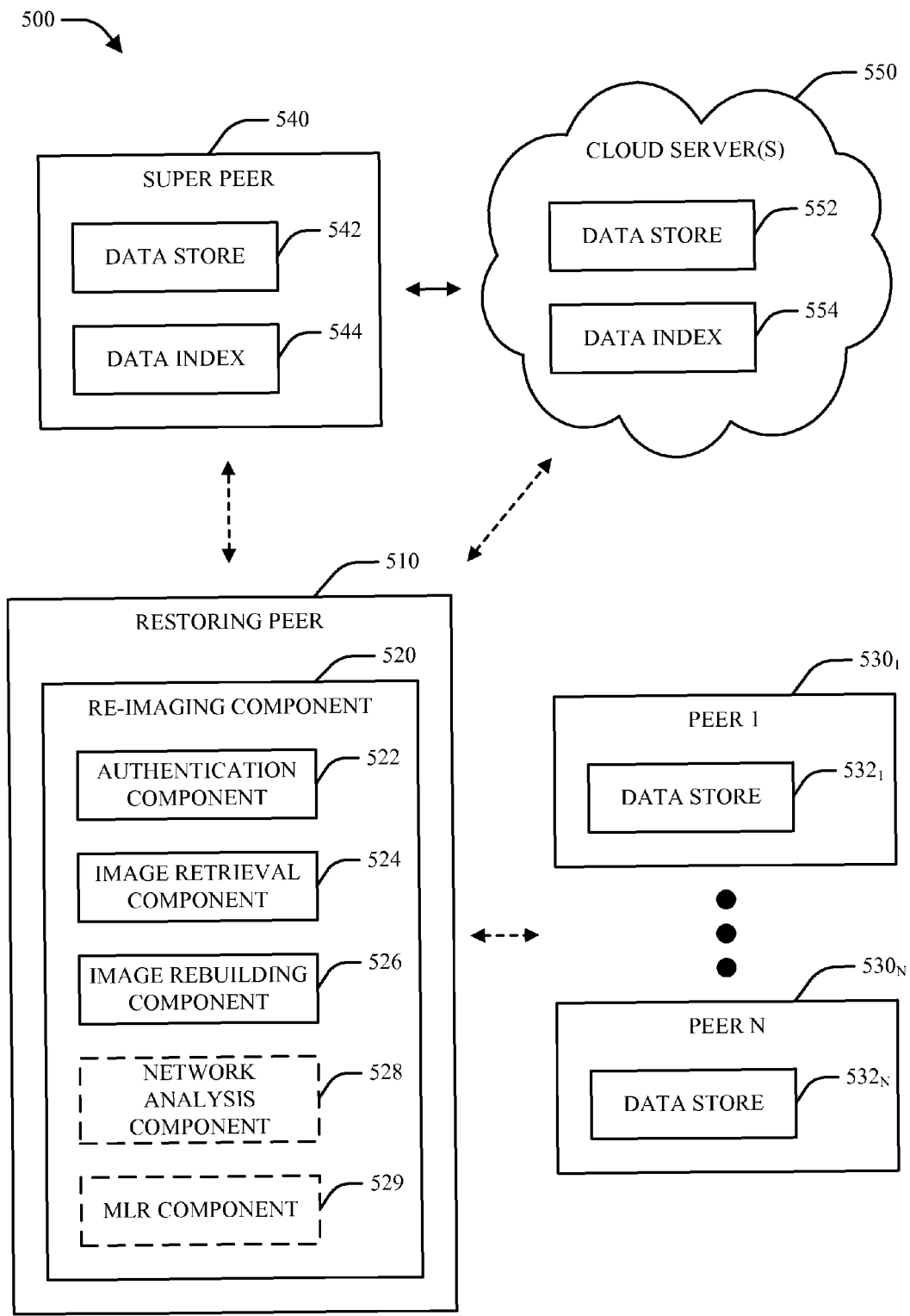
FIGS. 5-6 are block diagrams of respective systems for restoring system information from a hybrid cloud-based and peer-to-peer backup architecture in accordance with various aspects.

Referring to FIG. 5, a system 500 for restoring system information from a hybrid cloud-based and peer-to-peer backup architecture is illustrated. As system 500 illustrates, a hybrid P2P/cloud backup architecture can be utilized, wherein backup data corresponding to a restoring peer machine 510 can be distributed among respective data stores 532, 542, and/or 552 at one or more peer machines 530, one or more super peer machines 540, and/or one or more cloud storage locations 550. In addition, although not illustrated in system 500, data corresponding to restoring peer 510 can additionally be stored locally at restoring peer 510. In addition to respective data stores 542 and/or 552, super peer 540 and/or cloud server(s) 550 can additionally include respective data indexes 544 and/or 554 (e.g., as created by an indexing component 312) that provides a master listing of some or all data stored within system 500 and their respective locations within system 500. Although data indexes 544 and 554 are respectively illustrated as located at super peer 540 and cloud server(s) 550, it should be appreciated that data indexes or portions thereof could additionally or alternatively be located at one or more peers 510 and/or 530.

By way of example, upon successful booting of restoring peer 510 (e.g., by a boot component 420), a re-imaging component 520 can facilitate rebuilding an operating system or environment associated with restoring peer in the following manner. First, re-imaging component can authenticate with one or more peers 530, super peers 540, and/or cloud servers 550 via an authentication component 522, which can utilize any authentication technique(s) generally known in the art for establishing a secure connection between a group of entities. Once one or more connections have been established by authentication component 522, an image retrieval component 524 can obtain some or all of an image (e.g., in VHD, VIM, and/or any other suitable format) of an operating system or environment associated with restoring peer 510, and/or incremental portions thereof, from one or more respective data stores 532, 542, or 552 at peers 530, super peers 540, or cloud servers 550. Subsequently, an image and/or portions thereof obtained by image retrieval component 524 can be utilized by an image rebuilding component 526 to restore the operating environment of restoring peer 510 to a desired state.

In accordance with one aspect, the hybrid P2P/cloud backup architecture of system 500 can be exploited by authentication component 522 and/or image retrieval component 524 to minimize latency and/or bandwidth required to restore information at restoring peer 510. For example, restoring peer 510 can utilize a network analysis component 528, which can analyze system 500 to enable restoring peer 500 to obtain information from the path of least resistance through system 500. Thus, for example, in the event that a given image or image portion resides at a peer 530 or super peer 540 as well as at a cloud server 550, preference can be given to pulling the block from the nearest network nodes first. As a result, a peer 530 and/or super peer 540 can be prioritized over cloud servers 550 in some instances to minimize the latency and bandwidth usage associated with communicating with cloud servers 550. Additionally or alternatively, network analysis component 528 can analyze availability of respective nodes in system 500, relative network loading, and/or other factors to facilitate intelligent selection of nodes from which to obtain information. Similarly, authentication component can utilize network analysis component 528 to select one or more nodes in system 500 with which to authenticate based on node availability, network topology, network loading, and/or other factors. In another example, an MLR component 529 can be utilized to intelligently automate the process of selecting nodes with which to communicate in system 500.

In an additional example, image retrieval component can utilize respective block indexes 544 and/or 554 at super peers 540 and/or cloud storage 550 to determine one or more optimal locations from which to obtain information. For example, upon determining a version of an image and/or a set of incremental images to be obtained, image retrieval component 524 and/or any other suitable component associated with re-imaging component 520 can utilize one or more data indexes 544 to determine at least one location in system 500 from which the desired image(s) can be found. In one example, data indexes 544 and/or 554 can be used in combination with network analysis component 528 to determine an optimal location for obtaining one or more images from among a set of accessible locations.

In accordance with one aspect, image rebuilding component 526 can rebuild an operating environment associated with restoring peer 510 by merging one or more incremental images obtained from system 500 with the locally available operating system or environment of restoring peer 510. By way of specific, non-limiting example, a reverse difference algorithm can be utilized, wherein one or more noted differences between a locally available OS and obtained images relating to a desired OS version are subtracted from the locally available version of the OS in order to roll back to the desired version. It should be appreciated, however, that such an algorithm is merely an example of a restoration technique that could be utilized, and that any other restoration algorithm could be used in addition to or in place of such an algorithm.

Figure 6:
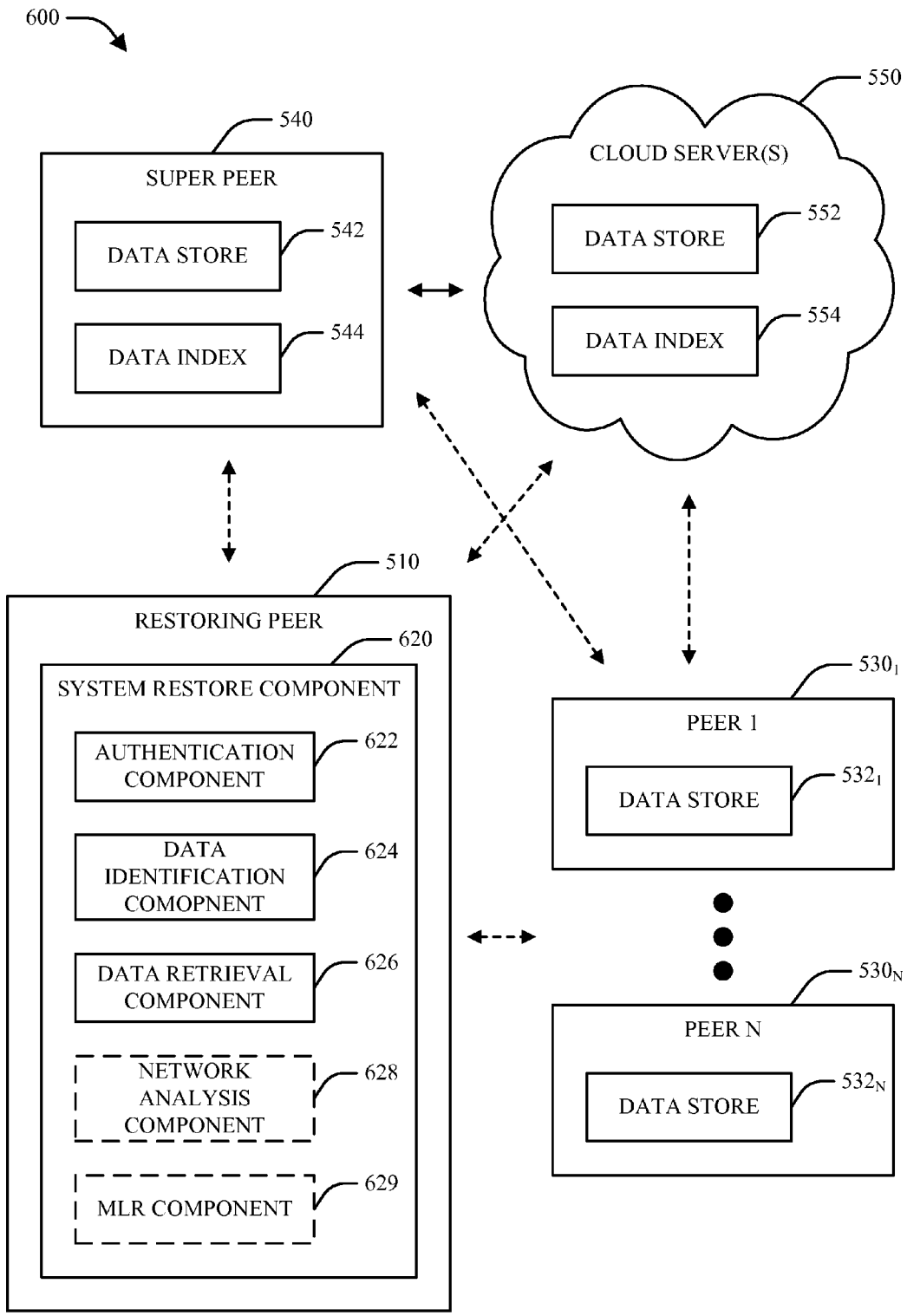

Turning to FIG. 6, another system 600 for restoring system information from a hybrid cloud-based and peer-to-peer backup architecture is illustrated. In one example, system 600 can include a restoring peer 510 and one or more other peers 530, super peers 540, and/or cloud servers 540, which can operate as described above in relation to system 500. For example, as noted above, peers 530 can include respective data stores 532, super peers 540 can include respective data stores 542 and/or data indexes 544, and cloud servers 550 can include respective data stores 552 and data indexes 554.

In accordance with one aspect, upon booting of restoring peer 510 (e.g., via a boot component 420) and restoration of an OS associated with restoring peer 510 (e.g., via a re-imaging component 520), restoring peer 510 can utilize a system restore component 620 to restore one or more files, system settings, or other information associated with restoring peer 510. As illustrated by system restore component 620, an authentication component 622 can first be utilized to authenticate to one or more locations within system 600 in order to retrieve data. In one example, authentication component 622 can authenticate to one or more locations within system 600 in a similar manner to authentication component 522 and/or in any other suitable manner. Alternatively, authentication component 622 can leverage one or more existing authentications previously established during OS rebuilding and/or another preceding phase in the restore process (e.g., by authentication component 522).

Upon successful authentication, a data identification component 624 can be utilized to identify files, settings, and/or other information to be obtained. The identified information can subsequently be obtained by a data retrieval component 626. In one example, data retrieval component 626 can utilize a network analysis component 628 and/or a MLR component 629 in a similar manner to network analysis component 528 and/or MLR component 529 to intelligently determine locations within system 600 from which to obtain information. Additionally or alternatively, one or more data indexes 544 and/or 554 can be utilized by data retrieval component 626 in selecting network locations. Further, information obtained by data retrieval component 626 can comprise full files and/or other similar information, or alternatively such information can include segments or incremental updates corresponding to respective files, which can be rebuilt using a reverse difference algorithm and/or any other suitable technique(s).

Figure 7:
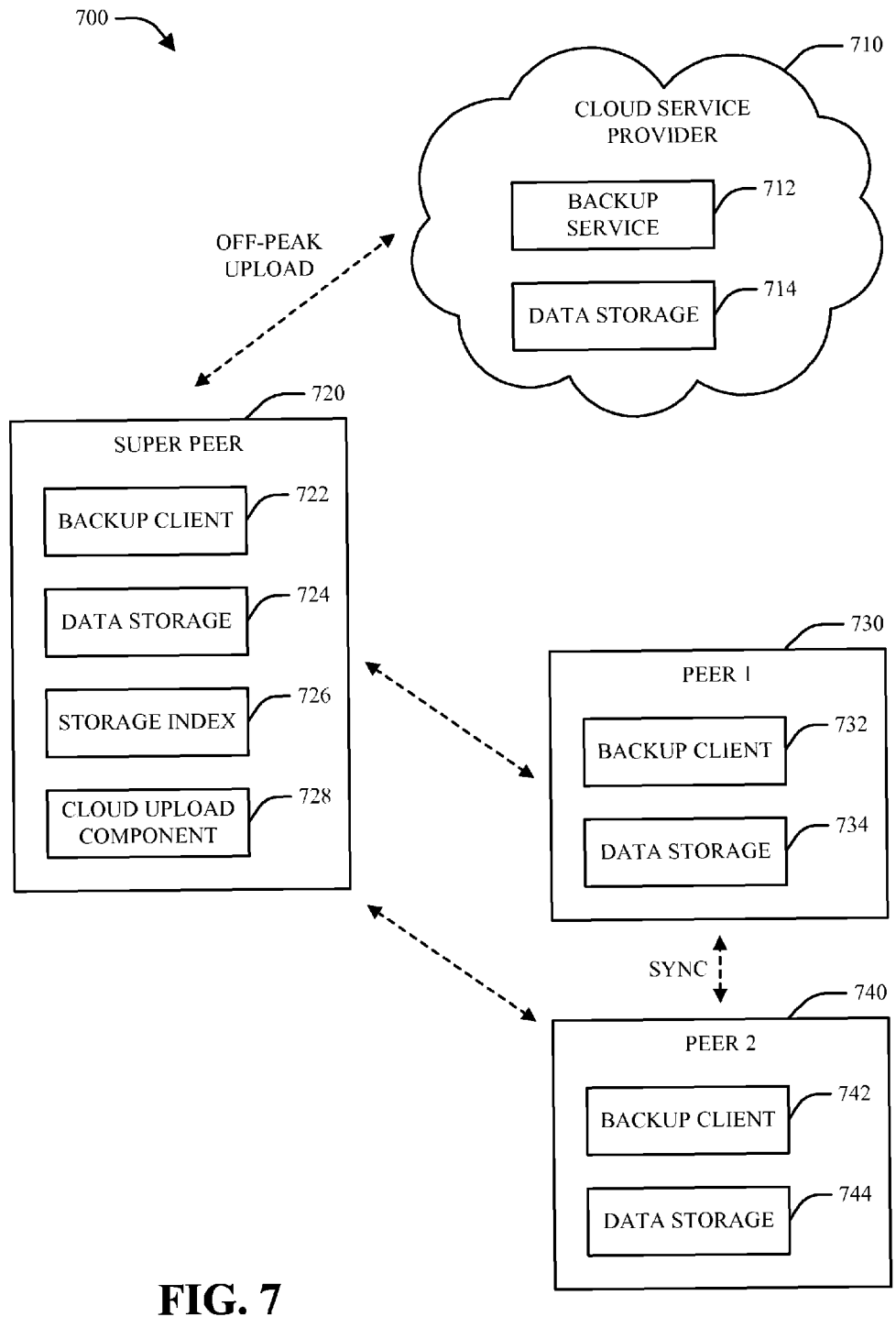
FIG. 7 illustrates an example network implementation that can be utilized in connection with various aspects described herein.

Referring next to FIG. 7, a diagram 700 is provided that illustrates an example network implementation that can be utilized in connection with various aspects described herein. As diagram 700 illustrates, a network implementation can utilize a hybrid peer-to-peer and cloud-based structure, wherein a cloud service provider 710 interacts with one or more super peers 720 and one or more peers 730-740.

In accordance with one aspect, cloud service provider 710 can be utilized to remotely implement one or more computing services from a given location on a network/internetwork associated with super peer(s) 720 and/or peer(s) 730-740 (e.g., the Internet). Cloud service provider 710 can originate from one location, or alternatively cloud service provider 710 can be implemented as a distributed Internet-based service provider. In one example, cloud service provider 710 can be utilized to provide backup functionality to one or more peers 720-740 associated with cloud service provider 710. Accordingly, cloud service provider 710 can implement a backup service 712 and/or provide associated data storage 714.

In one example, data storage 714 can interact with a backup client 722 at super peer 720 and/or backup clients 732 or 742 at respective peers 730 or 740 to serve as a central storage location for data residing at the respective peer entities 720-740. In this manner, cloud service provider 710, through data storage 714, can effectively serve as an online "safe-deposit box" for data located at peers 720-740. It can be appreciated that backup can be conducted for any suitable type(s) of information, such as files (e.g. documents, photos, audio, video, etc.), system information, or the like. Additionally or alternatively, distributed network storage can be implemented, such that super peer 720 and/or peers 730-740 are also configured to include respective data storage 724, 734, and/or 744 for backup data associated with one or more machines on the associated local network. In another example, techniques such as de-duplication, incremental storage, and/or other suitable techniques can be utilized to reduce the amount of storage space required by data storage 714, 724, 734, and/or 747 at one or more corresponding entities in the network represented by diagram 700 for implementing a cloud-based backup service.

In accordance with another aspect, cloud service provider 710 can interact with one or more peer machines 720, 730, and/or 740. As illustrated in diagram 700, one or more peers 720 can be designated as a super peer and can serve as a liaison between cloud service provider 710 and one or more other peers 730-740 in an associated local network. While not illustrated in FIG. 7, it should be appreciated that any suitable peer 730 and/or 740, as well as designated super peer(s) 720, can directly interact with cloud service provider 710 as deemed appropriate. Thus, it can be appreciated that cloud service provider 710, super peer(s) 720, and/or peers 730 or 740 can communicate with each other at any suitable time to synchronize files or other information between the respective entities illustrated by diagram 700.

In one example, super peer 720 can be a central entity on a network associated with peers 720-740, such as a content distribution network (CDN), an enterprise server, a home server, and/or any other suitable computing device(s) determined to have the capability for acting as a super peer in the manners described herein. In addition to standard peer functionality, super peer(s) 720 can be responsible for collecting, distributing, and/or indexing data among peers 720-740 in the local network. For example, super peer 720 can maintain a storage index 726, which can include the identities of respective files and/or file segments corresponding to peers 720-740 as well as pointer(s) to respective location(s) in the network and/or in cloud data storage 714 where the files or segments thereof can be found. Additionally or alternatively, super peer 720 can act as a gateway between other peers 730-740 and a cloud service provider 710 by, for example, uploading respective data (e.g., full or partial OS images) to the cloud service provider 710 at designated off-peak periods via a cloud upload component 728. In another example, super peer 620 can serve as a cache for "hot" or "cold" data, such that the data that is most likely to be restored has a copy located closer to the restoring or originating peer and, over time, more copies are distributed to "colder" parts of the distributed system (e.g. data storage 614 at cloud service provider 610).

Figure 8:
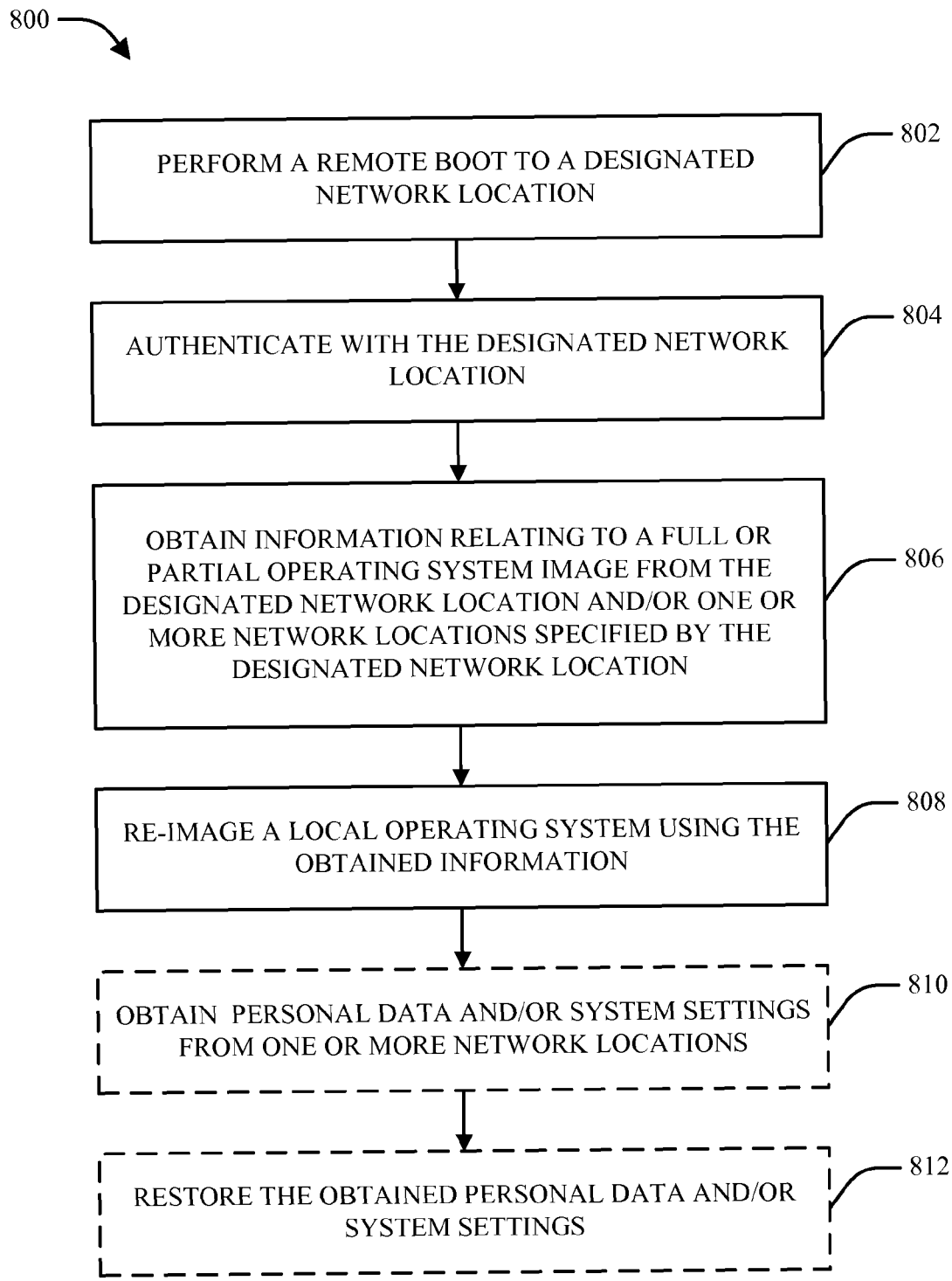
FIG. 8 is a flowchart of a method for performing system recovery within a network-based backup system.
Figure 9:
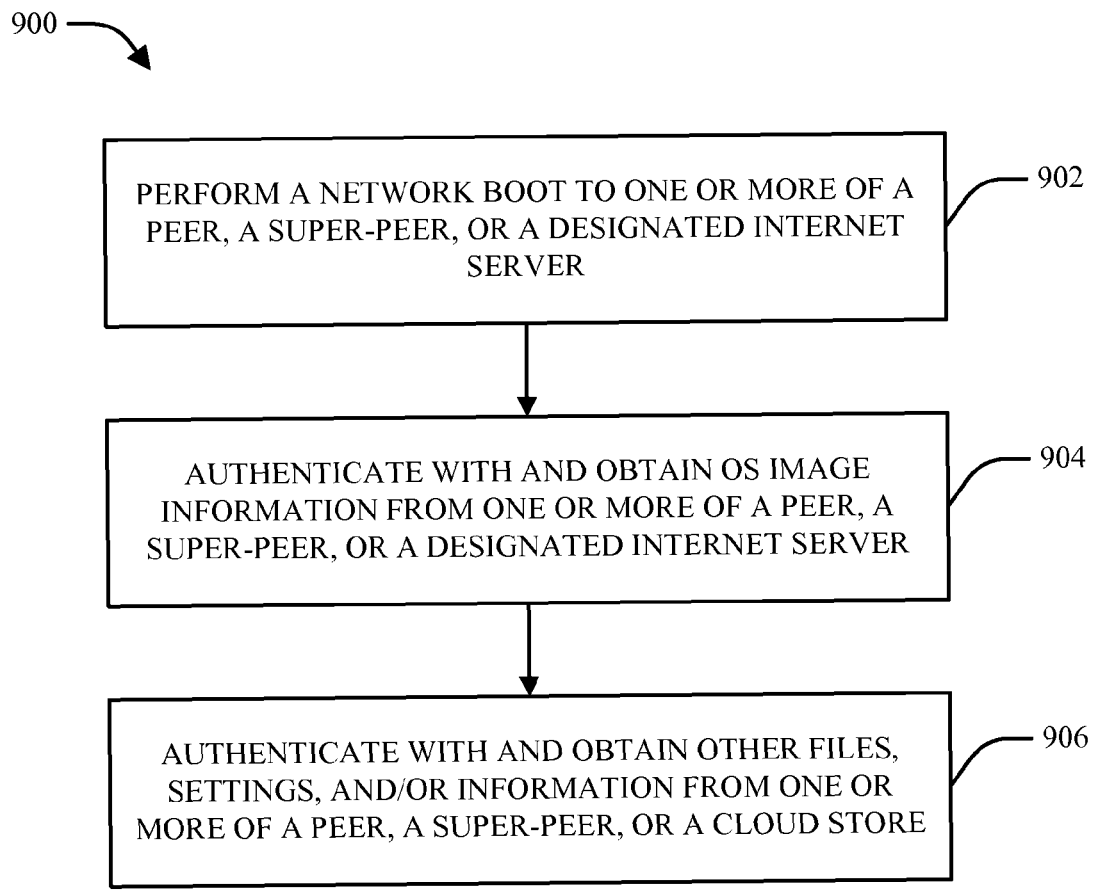
FIG. 9 is a flowchart of a method for initializing system recovery and obtaining recovery data from one or more network locations.

Turning to FIGS. 8-9, methodologies that may be implemented in accordance with various features presented herein are illustrated via respective series of acts. It is to be appreciated that the methodologies claimed herein are not limited by the order of acts, as some acts may occur in different orders, or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as claimed herein.

Referring to FIG. 8, a method 800 for performing system recovery within a network-based backup system is illustrated. At 802, a remote boot is performed (e.g., by a boot component 112) to a designated network location (e.g., a cloud service provider 710, a super peer 720, and/or a peer 730 or 740). At 804, authentication is performed with the designated network location. At 806, information relating to a full or partial operating system image is obtained (e.g., by a re-imaging component 114) from the designated network location and/or one or more other network locations specified by the designated network location. At 808, a local operating system is re-imaged using the information obtained at 806.

Method 800 can conclude following 808, or alternatively method 800 can proceed to 810, wherein personal data and/or system settings are obtained (e.g. by a system restore component 116) from one or more network locations. Subsequently, at 812, the personal data and/or system settings obtained at 810 are restored.

Referring now to FIG. 9, a flowchart of a method 900 for initializing system recovery and obtaining recovery data from one or more network locations is provided. At 902, a network boot is performed to one or more of a peer, a super-peer, or a designated internet server. At 904, authentication is performed with, and OS image information (e.g., corresponding to a full or partial OS image) is obtained from, one or more of a peer, a super-peer, or a designated internet server. At 906, authentication is performed with one or more of a peer, a super-peer, or a cloud store, and other files, settings, and/or information are obtained from the location(s) with which authentication is performed.

Figure 10:
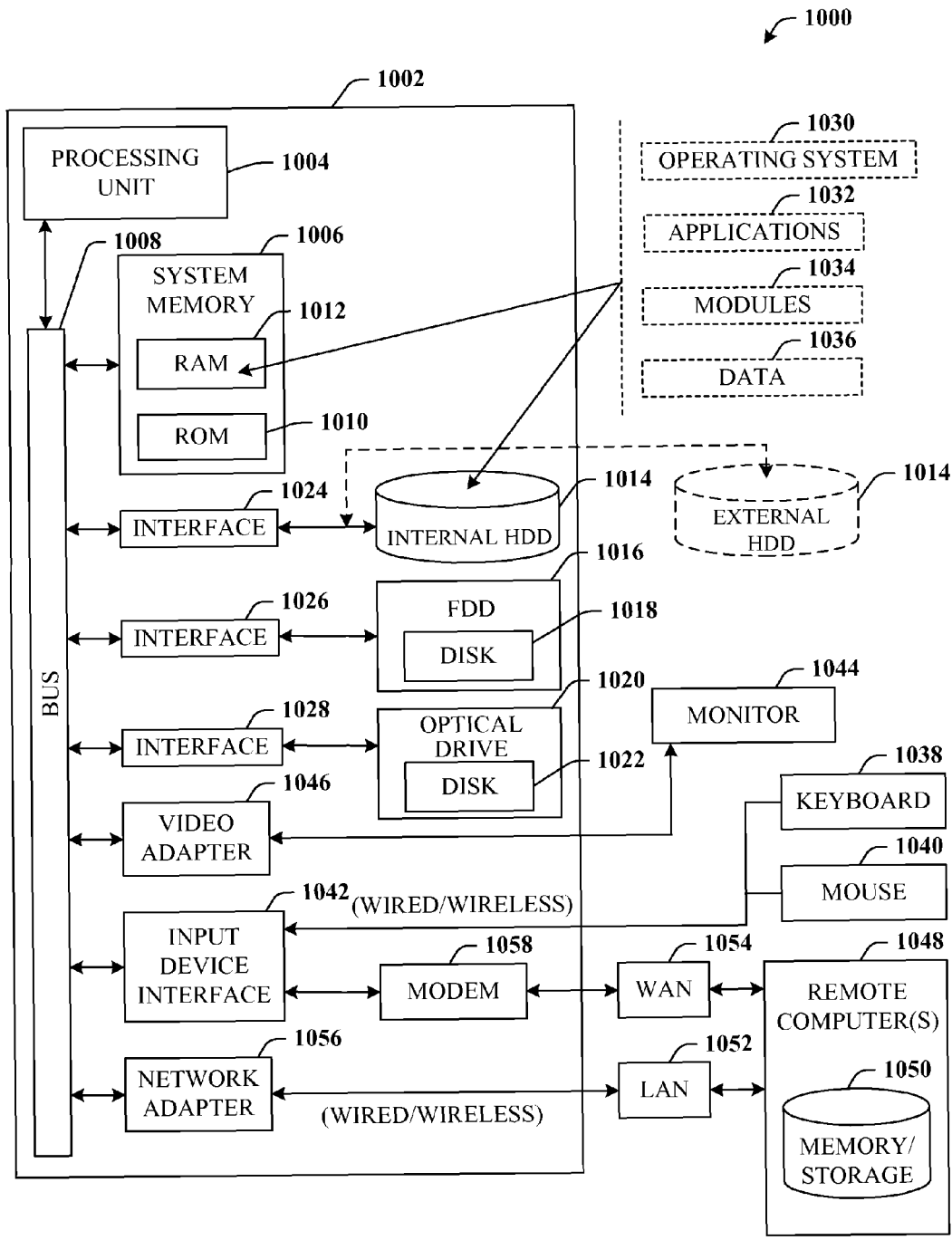
FIG. 10 is a block diagram of a computing system in which various aspects described herein can function.

In order to provide additional context for various aspects described herein, FIG. 10 and the following discussion are intended to provide a brief, general description of a suitable computing environment 1000 in which various aspects of the claimed subject matter can be implemented. Additionally, while the above features have been described above in the general context of computer-executable instructions that may run on one or more computers, those skilled in the art will recognize that said features can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the claimed subject matter can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, an exemplary environment 1000 for implementing various aspects described herein includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE-1394 interface technologies. Other external drive connection technologies are within contemplation of the subject disclosure.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, a serial port, an IEEE-1394 port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11 (a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 13 Mbps (802.11a) or 54 Mbps (802.11b) data rate, for example, or with products that contain both bands (dual band). Thus, networks using Wi-Fi wireless technology can provide real-world performance similar to a 10 BaseT wired Ethernet network.

Figure 11:
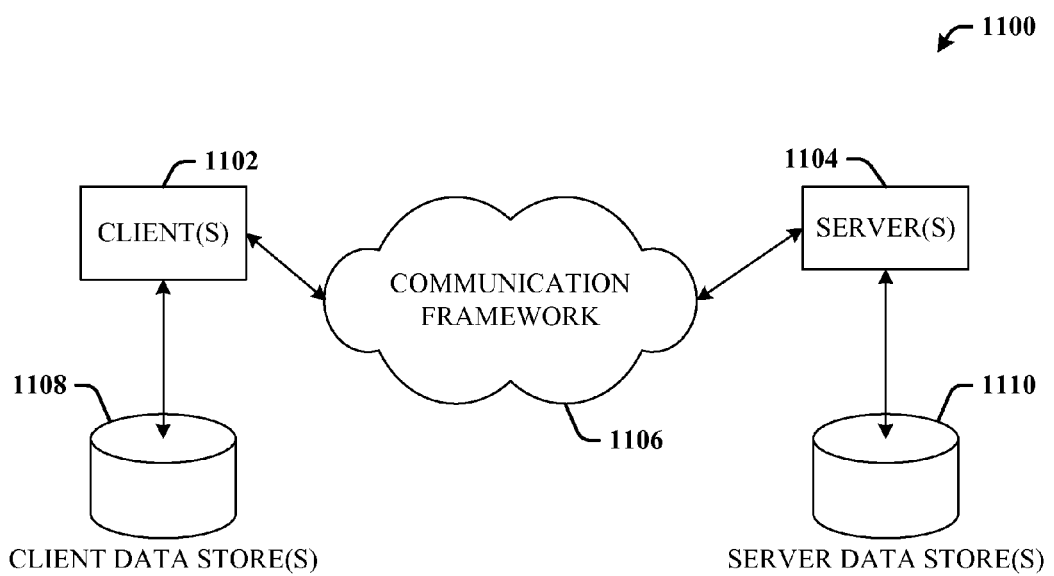
FIG. 11 illustrates a schematic block diagram of an example networked computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). In one example, the client(s) 1102 can house cookie(s) and/or associated contextual information by employing one or more features described herein.

The system 1100 also includes one or more server(s) 1104. The server(s) 1104 can also be hardware and/or software (e.g., threads, processes, computing devices). In one example, the servers 1104 can house threads to perform transformations by employing one or more features described herein. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g. a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the described aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computing device, comprising a processor that executes machine-executable components stored on a computer-readable medium, the computing device having access to a designated first remote location on a network and a designated second remote location on the network, the components comprising:

a remote boot component that boots the computing device from a remote boot server, wherein the remote boot server provides the designated first remote location via the network to the computing device, the first remote location comprising a peer in a peer-to-peer network, the designated first remote location having been determined by the computing device by a network analysis performed by the computing device during a backup of the computing device;

an image retrieval component that, responsive to obtaining the designated first remote location, retrieves operating system (OS) image information from the designated first remote location;

an image rebuilding component that performs a bare-metal restore by rebuilding an associated OS on the computing device using the OS image information; and a system restore component that, when the computing device has been authenticated, obtains a designated second remote network location from an index at the designated first remote location and restores personal data and settings from the designated second remote network location, the designated second remote network location comprising a cloud storage location.

2. The computing device of claim 1, wherein the image rebuilding component merges one or more incremental images obtained by the image retrieval component with a locally available operating system.

3. The system of claim 1, wherein the designated remote boot location specifies one or more network locations corresponding to peers, super-peers, or cloud storage locations for obtaining OS image information.

4. The computing device of claim 3, wherein the designated remote boot location specifies at least one network location using an index, and the image retrieval component identifies the at least one specified network location based on the index.

5. The computing device of claim 3, wherein the image retrieval component applies a higher level of preference to network locations corresponding to peers than to network locations corresponding to cloud storage locations.

6. The computing device of claim 1, further comprising a system restore component that retrieves and restores at least one of files or system settings from the designated boot location or at least one location specified by the network boot location.

7. The computing device of claim 6, wherein the designated remote boot location specifies one or more network locations corresponding to peers or cloud storage locations for obtaining at least one of files or system settings.

8. The computing device of claim 6, further comprising a network analysis component that determines network locations to be utilized by the image retrieval component or the system restore component for obtaining information based on at least one of network topology, network loading, network location availability, or proximity of respective network locations.

9. The computing device of claim 8, further comprising a machine learning and reasoning (MLR) component that automates at least one determination by the network analysis component using one or more machine learning algorithms.

10. The computing device of claim 1, wherein the boot component is configured to initiate booting based on instructions from the designated remote boot location.

11. The computing device of claim 1, wherein the boot component is configured to initiate booting based on instructions locally stored on a computer-readable medium.

12. A method performed by a computing device to restore the computing device using a first designated network location on a network, a second designated location on the network, and a third designated network location on the network, comprising:
   performing a network boot from a boot server and obtaining from the boot server the first designated network location comprising either a peer storage location or a cloud storage location;
   obtaining from an index at the first designated network location the second designated network location identifying either a peer storage location or a cloud storage location storing an operating system (OS) image or portion thereof, the second designated network location having been previously selected by the computing device, the computing device having performed network analysis on peer locations and cloud locations to select an optimal location from among the peer locations and the cloud locations;
   responsive to obtaining the second designated network location, retrieving operating system (OS) image information from the second designated network location, the OS image information having been previously added to the index by the computing device;
   re-imaging an operating system locally on the computing device using the obtained OS image information; and
   after the re-imaging, performing an authentication of the computing device and in response to authentication obtaining and restoring personal data and settings from a third designated network location comprising a peer storage location in the peer-to-peer network or from a cloud storage location, the third designated network location having been previously selected by the computing device having performed network analysis on the peer locations and cloud locations to select an optimal location from among the peer locations and the cloud locations.

13. The method of claim 12, further comprising including, in the OS image information a full OS image or at least one portion of an OS image.

14. The method of claim 13, wherein the network analyses are based on at least one of network topology, network loading, network location availability, or proximity of respective locations.

15. The method of claim 12, further comprising authenticating with the second designated network location.

16. A machine-readable storage medium having stored thereon instructions which, in response to execution by a machine, cause the machine to act as a system for performing system recovery from a network-based backup system having a peer location in a peer-to-peer network and a cloud location in a cloud, by operations comprising:
   performing an imaging backup by the machine, the imaging backup comprising selecting a designated location from among the peer location in the peer-to-peer network and the cloud location in the cloud, the imaging backup further comprising storing operating system (OS) information corresponding to an OS on the machine;
   conducting a network boot to a boot location comprising a peer machine in a local network or a designated internet server, the boot location obtaining the designated location and providing the designated location to the machine;
   obtaining the OS information from the boot location;
   re-imaging a local OS of the machine based on the obtained OS information; and
   after the re-imaging, obtaining one or more system settings and personal data from a designated internet storage location corresponding to a peer or a cloud storage location, the designated internet storage location comprising a location other than the designated location, and completing the system recovery by recovering the obtained system settings and personal data, to the re-imaged local OS.

\* \* \* \* \*